US 11,809,649 B2

(12) United States Patent
Cheng et al.

(10) Patent No.: US 11,809,649 B2
(45) Date of Patent: Nov. 7, 2023

(54) ELECTRONIC INK SCREEN AND METHOD FOR MANUFACTURING THE SAME

(71) Applicants: FUZHOU BOE OPTOELECTRONICS TECHNOLOGY CO., LTD., Fujian (CN); BOE TECHNOLOGY GROUP CO., LTD., Beijing (CN)

(72) Inventors: Li Cheng, Beijing (CN); Jianming Huang, Beijing (CN); Hailong Yu, Beijing (CN); Yabin Lin, Beijing (CN); Chuanhe Jing, Beijing (CN); Wanping Pan, Beijing (CN); Xianjuan Jin, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 505 days.

(21) Appl. No.: 17/044,005

(22) PCT Filed: Nov. 29, 2019

(86) PCT No.: PCT/CN2019/121904
§ 371 (c)(1),
(2) Date: Sep. 30, 2020

(87) PCT Pub. No.: WO2021/102890
PCT Pub. Date: Jun. 3, 2021

(65) Prior Publication Data
US 2023/0152913 A1    May 18, 2023

(51) Int. Cl.
*G06F 3/041*    (2006.01)

(52) U.S. Cl.
CPC ........ *G06F 3/0412* (2013.01); *G06F 3/04164* (2019.05)

(58) Field of Classification Search
None
See application file for complete search history.

(56) References Cited

U.S. PATENT DOCUMENTS

2019/0324343 A1    10/2019    Atkinson et al.
2019/0346952 A1*  11/2019    Wu ...................... G06F 3/0412

FOREIGN PATENT DOCUMENTS

CN         203706175 U      7/2014
CN         105676557 A      6/2016
(Continued)

OTHER PUBLICATIONS

Translation of CN 105676557 A into English; Yang et al. (Year: 2016).*

*Primary Examiner* — Brian M Butcher
(74) *Attorney, Agent, or Firm* — Nath, Goldberg & Meyer; Joshua B. Goldberg

(57) ABSTRACT

An electronic ink screen and a method for manufacturing the same are provided. The electronic ink screen includes: a display module including pixel units configured to display by using electronic ink; and a control module configured to convert a touch signal applied from outside into a change of electric signal of corresponding one or more pixel units through an electrode microstructure, so that a display state of the corresponding one or more pixel units is changed from an initial state; the electrode microstructure includes sub-electrode microstructures, each sub-electrode microstructure includes a first nano electrode and a second nano electrode which are made of different materials, the first nano electrode and the second nano electrode are arranged at intervals and configured to be in mutual friction contact in response (Continued)

to that the touch signal applied from the outside is received, so as to generate charge transferring.

14 Claims, 5 Drawing Sheets

(56) References Cited

FOREIGN PATENT DOCUMENTS

| CN | 109656077 A | 4/2019 |
|---|---|---|
| CN | 110174196 A | 8/2019 |

* cited by examiner

ELECTRONIC INK SCREEN AND METHOD FOR MANUFACTURING THE SAME

This is a National Phase Application filed under 35 U.S.C. 371 as a national stage of PCT/CN2019/121904, filed Nov. 29, 2019, the content of which is hereby incorporated by reference in its entirety.

TECHNICAL FIELD

The present disclosure relates to the technical field of electronic ink screens, in particular to an electronic ink screen and a method for manufacturing the electronic ink screen.

BACKGROUND

In recent years, the progress of flat panel display technology is increasing day by day. However, current flat panel displays cannot be used to read as conveniently as ordinary books and newspapers. Electronic paper is developed accordingly. The electronic paper has a paper-like property of being light, thin, soft, foldable, rollable and convenient to be carried, has advantages of wide visual angle, high contrast, large capacity and updatability, and makes positive contribution to an improvement of earth ecology by characteristics of low cost, low power consumption, economy and environmental protection.

At present, an implementation mode of adding a writing function to the electronic paper is to integrate a touch screen on a display screen in a liquid crystal display mode or any other display mode, pressing track data of an electronic pen or a finger is obtained through the touch screen, and the data are converted into display signals through a central processor and transmitted to the display screen to display a writing track. However, this implementation inevitably has the following problems in practical applications:

first, display delay may occur; and secondly, an energy consumption of the display screen equipped with the touch screen is relatively large.

SUMMARY

The present disclosure is directed to at least solve one of technical problems in the related art, and provides an electronic ink screen and a method for manufacturing the electronic ink screen, which are used to avoid display delay and reduce energy consumption.

To achieve the above object, the present disclosure provides an electronic ink screen, including a display module, a control module and a circuit module, where the display module includes a plurality of pixel units configured to display with electronic ink;

the control module is configured to convert a touch signal applied from outside into a change of electric signal of corresponding one or more of the pixel units through an electrode microstructure, so that a display state of the corresponding one or more of the pixel units is changed from an initial state; the electrode microstructure includes sub-electrode microstructures in one-to-one correspondence with the pixel units, each of the sub-electrode microstructures includes a first nano electrode and a second nano electrode which are made of different materials, and the first nano electrode and the second nano electrode are arranged at intervals and configured to be in mutual friction contact under the touch signal applied from the outside for charge transferring;

the circuit module is configured to supply power and control the control module to restore the display module to the initial state.

In some implementations, the first nano electrode and the second nano electrode are both comb-shaped electrodes, and teeth of the first nano electrode and teeth of the second nano electrode are alternately arranged in a direction parallel to a display surface, and partially overlap in a direction perpendicular to the display surface.

In some implementations, the control module includes an intermediate substrate and a first substrate that are disposed opposite to each other;

a plurality of intermediate electrodes, a plurality of thin film transistors, a coupling wire, an intermediate common electrode line and an intermediate electrode gate line are arranged on a surface of the intermediate substrate facing the first substrate, and the intermediate electrodes are arranged in one-to-one correspondence with the pixel units; for each of the pixel units, the first nano electrode is arranged on a surface of the intermediate electrode away from the intermediate substrate, and is electrically coupled to the intermediate electrode; the thin film transistors are arranged in one-to-one correspondence with the pixel units; for each of the pixel units, a gate electrode of the thin film transistor is electrically coupled to the intermediate electrode gate line; a source electrode of the thin film transistor is electrically coupled to the intermediate common electrode line through the coupling wire, and a drain electrode of the thin film transistor is electrically coupled to the intermediate electrode;

a plurality of first electrodes and a first common electrode line are arranged on a surface of the first substrate facing the intermediate substrate, where the first electrodes are arranged in one-to-one correspondence with the intermediate electrodes and opposite to the intermediate electrodes, and are electrically coupled to the first common electrode line; and for each of the pixel units, the second nano electrode is arranged on a surface of the first electrode away from the first substrate, and is electrically coupled to the first electrode.

In some implementations, the display module further includes a second substrate, the second substrate is disposed opposite to the intermediate substrate and located at a side away from the first substrate, a second electrode is disposed on a surface of the second substrate facing the intermediate substrate, and electronic ink is disposed between the second electrode and the intermediate substrate.

In some implementations, the circuit module includes a power supply, a first switch and a second switch;

a first terminal of the power supply is electrically coupled to the second electrode, and a second terminal of the power supply is electrically coupled to the first common electrode line;

a first coupling circuit is arranged between the intermediate electrode gate line and the first terminal of the power supply, and the first switch is arranged in the first coupling circuit;

a second coupling circuit is arranged between the intermediate common electrode line and the first common electrode line, and the second switch is arranged in the second coupling circuit.

In some implementations, the circuit module includes a recovery power supply, a holding power supply, a first switch and a second switch;

a first terminal of the holding power supply is electrically coupled to the second electrode, and a second terminal of the holding power supply is electrically coupled to the first common electrode line;

a first coupling circuit is arranged between a first terminal of the recovery power supply and the intermediate electrode gate line, and the first switch is arranged in the first coupling circuit; a second terminal of the recovery power supply is electrically coupled to the first common electrode line;

a second coupling circuit is arranged between the intermediate common electrode line and the first common electrode line, and the second switch is arranged in the second coupling circuit.

In some implementations, the intermediate substrate, the first substrate, and the second substrate are all flexible substrates.

In some implementations, a first isolation pillar is further disposed between the intermediate substrate and the first substrate and at a position of the thin film transistor.

In some implementations, the display module includes a second substrate, a second electrode, and electronic ink, where the second substrate is arranged opposite to the intermediate substrate and is positioned on a side away from the first substrate;

the second electrode is arranged on a surface of the second substrate facing the intermediate substrate;

the electronic ink is disposed between the second electrode and the intermediate substrate.

In some implementations, the display module further includes a plurality of ink bags, each of the ink bags is configured to contain the electronic ink, and the ink bags are disposed in one-to-one correspondence with the pixel units.

In some implementations, the display module further includes a black matrix, the black matrix is disposed on a surface of the second substrate facing the intermediate substrate, and a second isolation pillar is further disposed between the intermediate substrate and the second substrate and at a position where the black matrix is located.

In some implementations, the second substrate is a flexible substrate.

In some implementations, the electronic ink includes a transparent dispersion medium, a white ink and a black ink, and a polarity of the white ink is opposite to that of the black ink; alternatively, the electronic ink may include electrophoretic particles and a dye solution.

In some implementations, the power supply is a direct current power supply; a value of a voltage output by the direct current power supply ranges from 0.5V to 5V.

In some implementations, the recovery power supply and the holding power supply are both direct current power supplies, and a value of a voltage output by the recovery power supply ranges from 3V to 5V; a value of a voltage output by the holding power supply ranges from 0.5V to 1V.

As another technical solution, the present disclosure further provides a method for manufacturing an electronic ink screen, including:

manufacturing a second substrate;
manufacturing an intermediate substrate;
manufacturing a first substrate;
aligning and gluing the intermediate substrate and the first substrate to form a composite substrate structure;
aligning and gluing the second substrate and the intermediate substrate in the composite substrate structure to form a cell, and injecting electronic ink into the cell;

where the manufacturing the second substrate includes: manufacturing a black matrix, a second electrode and a second isolation pillar on the second substrate;

the manufacturing the intermediate substrate includes: manufacturing an intermediate electrode gate line, an intermediate electrode, an intermediate common electrode line, a thin film transistor and a first nano electrode on the intermediate substrate;

the manufacturing the first substrate includes: manufacturing a first common electrode line, a first electrode, a second nano electrode and a first isolation pillar on the first substrate.

Beneficial effects of technical solutions of the present disclosure are as follows.

In the technical solutions of the electronic ink screen and the method for manufacturing the electronic ink screen provided by the present disclosure, the display module is configured to display by using electronic ink; the control module is configured to convert a touch signal applied from the outside into the change of electric signal of the corresponding one or more of the pixel units through the electrode microstructure to change the display state of the one or more of the pixel units from the initial state, thereby realizing the writing function; the circuit module is configured to provide electric energy and control the control module to enable the display module to be restored to the initial state, and therefore a writing reset function is achieved. Meanwhile, the electrode microstructure is based on a principle of nano friction power generation, namely, the touch signal applied from the outside is converted into the change of electric signal of the corresponding one or more of the pixel units by mutual friction contact between two nano electrodes made of different materials, and the writing track can be displayed in real time, so that the display delay can be avoided; in addition, the electronic ink screen provided by the present disclosure consumes energy only when the electronic ink deflects, and recording of the writing track can be realized by a conversion of the electrode microstructure without additional power consumption, and therefore the energy consumption can be effectively reduced.

DESCRIPTION OF EMBODIMENTS

In order to enable those skilled in the art to better understand the technical solutions of the present disclosure, the electronic ink screen and the method for manufacturing the electronic ink screen provided by the present disclosure are described in detail below with reference to the accompanying drawings.

Figure 1:
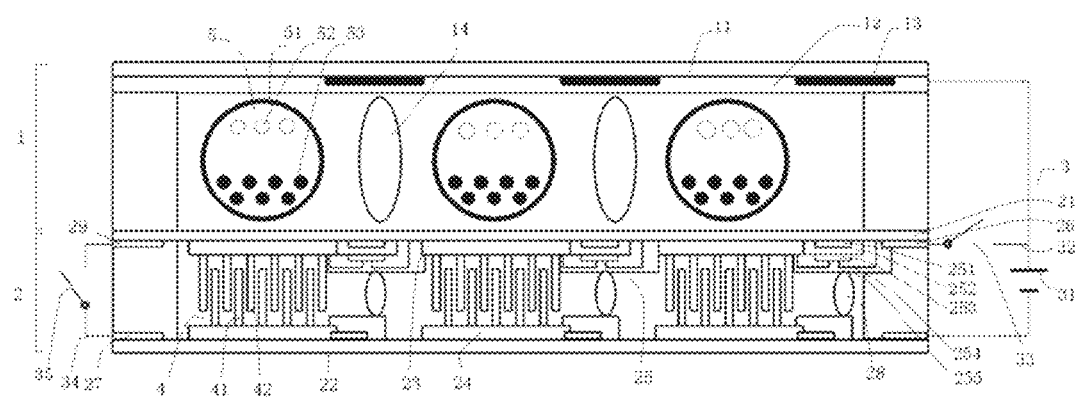
FIG. 1 is a structural diagram of an electronic ink screen according to an embodiment of the present disclosure.
Figure 2:
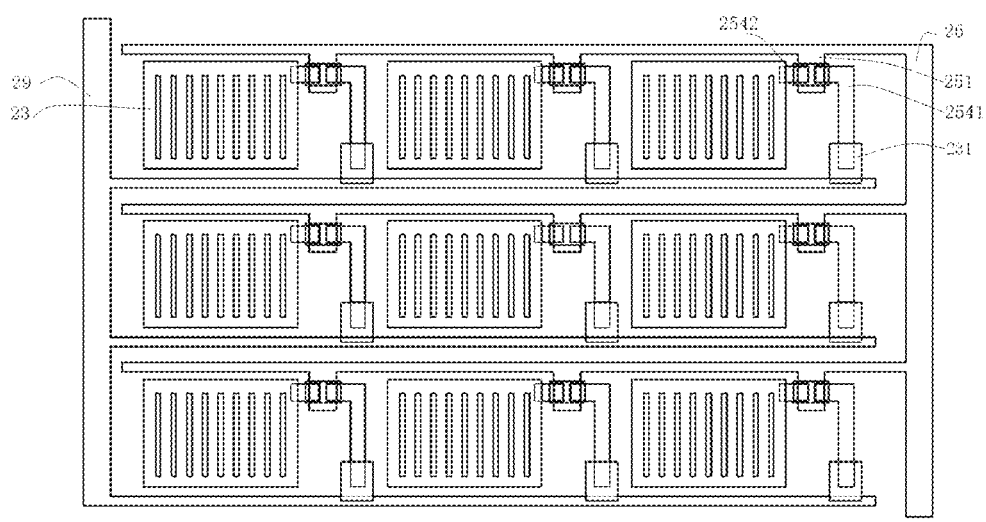
FIG. 2 is a top view of couplings of an intermediate electrode in a control module according to an embodiment of the present disclosure.
Figure 3:
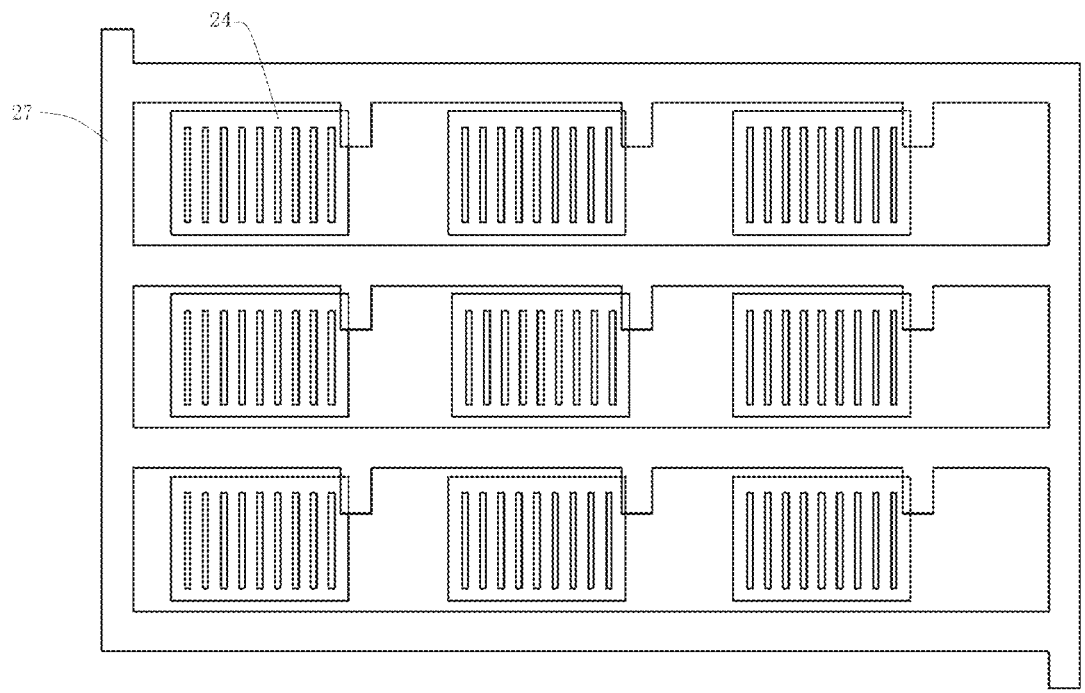
FIG. 3 is a top view of couplings of a first electrode in a control module according to an embodiment of the present disclosure.

Referring to FIGS. 1 to 3 together, an embodiment of the present disclosure provides an electronic ink screen having a writing function. In practical applications, the electronic ink screen provided by the embodiment of the present disclosure may be integrated with a conventional thin film transistor (TFT) control circuit, so as to have writing and displaying functions.

In some implementations, the electronic ink screen includes a display module 1, a control module 2 and a circuit module 3, where the display module 1 is configured to display by using electronic ink and includes a plurality of pixel units; the control module 2 is configured to convert a touch signal applied from outside into a change of electrical signal of corresponding one or more of the pixel units through an electrode microstructure, so that a display state of the corresponding one or more of the pixel units changes from an initial state. A change of the display state is, for example, a change of display color or a change of gray scale of a same color. The circuit module 3 is configured to provide electric energy and control the control module 2 to enable the display module 1 to be restored to the initial state.

When an electronic pen or a finger presses the screen, the touch signal applied to the screen is converted into a change of voltage of the pixel unit(s), corresponding to a position being pressed, by triboelectric of an electrode microstructure, the change of voltage is a change of potential difference across electrodes on two sides of the electronic ink, and the change can enable ink with different colors and different polarities in the electronic ink to displace, so that the display state of the pixel unit(s) corresponding to a writing track is changed from the initial state, namely, the writing track is displayed, and the writing function is realized. In addition, the circuit module 3 can control the control module 2 to restore the display module 1 to the initial state, i.e., eliminate the writing track, and reset the full screen, thereby implementing a writing reset function.

In some implementations, the initial state is that the full screen displays white or black, or any other monochrome. Certainly, the color of the displayed writing trace should be different from the color displayed in the initial state.

Specifically, the electrode microstructure includes sub-electrode microstructures 4 in one-to-one correspondence with the pixel units, each of the sub-electrode microstructures 4 includes a first nano electrode 41 and a second nano electrode 42 which are made of different materials, the first nano electrode 41 and the second nano electrode 42 are arranged at intervals, and when the touch signal applied from the outside is applied to the pixel unit where any sub-electrode microstructure 4 is located, the first nano electrode 41 and the second nano electrode 42 are in mutual friction contact under an external pressure, during which charge transferring occurs, so that a change of potential difference is generated.

In practical applications, any of the nano electrodes mentioned above is, for example, cubic or pyramidal, and by taking the nano electrode being cubic as an example, each of a length and a width of the nano electrode ranges from 10 μm to 40 μm, preferably is about 20 μm. A distance between any two adjacent first nano electrodes 41 (or second nano electrodes 42) ranges from 10 μm to 30 μm. Within such configuration, it is ensured that electric charges generated by friction between the first nano electrode 41 and the second nano electrode 42 are sufficient to drive a displacement of the ink.

In practical applications, the materials used for the first nano electrode 41 and the second nano electrode 42 may be selected with reference to materials of a nano friction generator in the related art, and are mainly selected according to the different electron adsorption capacities of the materials, which are measured by a characteristic of electronegativity, so that a difference between the electronegativity of the first nano electrode 41 and the electronegativity of the second nano electrode 42 needs to be as large as possible to generate a better electricity generation effect. Typically, the first nano electrode 41 is made of a polymer and the second nano electrode 42 is made of a metal. Specifically, the materials used for the first nano electrode 41 and the second nano electrode 42 are, for example: Polytetrafluoroethylene (PTFE) for the first nano electrode 41, and aluminum or NYLON or titanium dioxide for the second nano electrode 42; alternatively, the first nano electrode 41 may be made of perfluoroethylene propylene copolymer (FEP) and the second nano electrode 42 may be made of aluminum.

In the present embodiment, each of the first nano electrode 41 and the second nano electrode 42 is a comb-shaped electrode, and teeth of the first nano electrode 41 and teeth of the second nano electrode 42 are alternately arranged in a direction parallel to a display surface (i.e., in any horizontal direction in FIG. 1) and partially overlap in a direction perpendicular to the display surface (i.e., in a vertical direction in FIG. 1). The nano electrodes being the comb-shaped electrode can increase a contact area therebetween when the nano electrodes are subjected to the external force, and a generation of a large enough potential difference can be ensured.

It should be noted that, in practical applications, any other electrode microstructure may be adopted, for example, a structure adopted by a nano friction generator in the related art may be referred to.

According to the electronic ink screen provided by the embodiment of the disclosure, by using the principle that the electrode microstructure is based on the principle of nano friction power generation, that is, by using mutual friction contact between two nano electrodes made of different materials, the touch signal applied from the outside is converted into a change of electric signal of corresponding one or more of the pixel units, so that the writing track can be displayed in real time, and compared with a mode that the display screen carries a touch screen, display delay can be avoided, so that writing experience can be improved; in addition, the electronic ink screen provided by the embodiment of the present disclosure consumes energy only when the electronic ink deflects, and recording of the writing track can be realized by conversion of the electrode microstructure without additional power consumption, so that the energy consumption can be effectively reduced.

The structure of the electronic ink screen provided in the embodiment will be described in detail below, specifically, in the embodiment, the control module 2 includes an intermediate substrate 21 and a first substrate 22 which are opposite to each other. A plurality of intermediate electrodes 23, a plurality of thin film transistors 25, a coupling wire 231, an intermediate common electrode line 29, and an intermediate electrode gate line 26 are provided on a surface of the intermediate substrate 21 facing the first substrate 22.

The intermediate electrodes 23 are provided in one-to-one correspondence with the pixel units. It should be noted that an orthographic projection area of the intermediate electrode 23 on the intermediate substrate 21 can be defined as a minimum area unit for changing an electric field, which is the pixel unit. For each pixel unit, the first nano electrode 41 is disposed on a surface of the intermediate electrode 23 away from the intermediate substrate 21, and is electrically coupled to the intermediate electrode 23. The thin film transistors 25 are provided in one-to-one correspondence with the pixel units, and for each pixel unit, a gate electrode 251 of the thin film transistor 25 is electrically coupled to the intermediate electrode gate line 26; a source electrode 2541 of the thin film transistor 25 is electrically coupled to the intermediate common electrode line 29 through the coupling wire 231, and a drain electrode 2542 of the thin film transistor 25 is electrically coupled to the intermediate electrode 23. Specifically, the thin film transistor 25 includes a gate layer 251, a gate insulating layer 252, an active layer 253, a source-drain layer 254, and a passivation layer 255, which are sequentially disposed from the intermediate substrate 21 in a direction away from the intermediate substrate 21.

The thin film transistors 25 serve as a switch between the intermediate electrodes 23 and the intermediate common electrode lines 29, and when the intermediate electrode gate line 26 is energized, all the intermediate electrodes 23 are electrically coupled to the intermediate common electrode line 29. Thus, the intermediate electrodes 23 being electrically coupled to or decoupled from the intermediate common electrode line 29 can be achieved through the thin film transistor 25 under control of the intermediate electrode gate line 26.

A plurality of first electrodes 24 and a first common electrode line 27 are disposed on a surface of the first substrate 22 facing the intermediate substrate 21, where the first electrodes 24 are disposed in one-to-one correspondence with the intermediate electrodes 23, and each first electrode 23 is electrically coupled to the first common electrode line 27; and, for each pixel unit, the second nano electrode 42 is disposed on a surface of the first electrode 24 away from the first substrate 22, and is electrically coupled to the first electrode 23.

The display module 1 further includes a second substrate 11, the second substrate 11 is disposed opposite to the intermediate substrate 21 and is located at a side away from the first substrate 22, and a second electrode 12 is disposed on a surface of the second substrate 22 facing the intermediate substrate 21, and electronic ink 5 is disposed between the second electrode 12 and the intermediate substrate 21.

In some implementations, the electronic ink 5 is in an ink bag, and specifically, the display module 1 further includes a plurality of ink bags 51, where each ink bag 51 is configured to contain electronic ink and the ink bags are disposed in one-to-one correspondence with the pixel units. In practical applications, a size of the ink bag 51 ranges from 30 μm to 300 μm. For each pixel unit, one or more ink bags 51 may be provided.

The circuit module 3 includes a power supply 31, a first switch 33, and a second switch 35. A first terminal of the power supply 31 is electrically coupled to the second electrode 12, and a second terminal of the power supply 31 is electrically coupled to the first common electrode line 27.

A first coupling circuit 32 is provided between the intermediate electrode gate line 26 and the first terminal of the power supply 31, and the first switch 33 is provided in the first coupling circuit 32; a second coupling circuit 34 is provided between the intermediate common electrode line 29 and the first common electrode line 27, and the second switch 35 is provided in the second coupling circuit 34.

In some implementations, the power supply 31 is a direct current power supply; a value of voltage output by the direct current power supply ranges from 0.5V to 5V.

When the electronic ink screen is in the initial state, the first switch 33 is turned off, and an electric potential of the first electrode 24 is 0V at this time; potentials of the intermediate electrode 23 and the first electrode 24 are consistent and are both 0V; a potential of the second electrode 12 is equal to a voltage output by the direct current power supply (ranging from 0.5V to 5V). When the electronic pen or the finger presses the screen, based on the principle of nano friction electricity generation, the first nano electrode 41 and the second nano electrode 42 contact and rub with each other, and contact electric charge transferring is generated at a contact interface between the first nano electrode 41 and the second nano electrode 42, and the electric charge transferring causes a change of potential difference generated between the intermediate electrode 23 and the first electrode 24. The larger the force of pressing and the faster the speed of pressing are, the larger the area of the contact interface between the nano electrodes is, the faster the speed of relative displacement at the interface is, and the higher the potential difference is. In practical applications, the potential difference typically varies in a range from 1V to 5V. The change of the potential difference can reverse a direction of electric field between the intermediate electrode 23 and the second electrode 12, so that the color or gray scale displayed by the electronic ink at the pixel unit(s) corresponding to the position of pressing is different from the color or gray scale displayed by the electronic ink at other pixel units, namely, the writing track is displayed, and the writing function is realized.

When the first switch 33 and the second switch 35 are simultaneously turned off, the first coupling circuit 32 is turned on, thereby rendering the intermediate electrode gate line 26 electrically coupled to a positive electrode of the power supply 31, and the voltage output by the direct current power supply is applied to the intermediate electrode gate line 26, so that the intermediate electrodes 23 of all the pixel units are electrically coupled to the intermediate common electrode line 29; meanwhile, the second coupling circuit 34 is turned on, so that the common electrode line 29 is electrically coupled to the first common electrode line 27, thereby resetting a potential between the intermediate electrode 23 and the first electrode 24 to 0V, and further restoring the display module 1 to the above-mentioned initial state, i.e., eliminating the writing trace, resetting the full screen, thereby implementing the writing reset function.

In practical application, the voltage output by the direct current power supply may be selected from 0.5V to 5V according to specific conditions, within the range from 0.5V to 5V, it facilitates a change of displayed color or gray scale due to pressing, and meanwhile, a phenomenon that the thin film transistor cannot be turned on normally, due to a fact that the value of the voltage outputted is too small, is avoided; alternatively, it is beneficial to realize turning on of the thin film transistor, and at the same time, it is avoided that the value of the voltage outputted is too large so that the second electrode 12 needs a relatively large potential difference to change the direction of the electric field between the second electrode and the intermediate electrodes 23.

In some implementations, a first isolation pillar 28 is further disposed between the intermediate substrate 21 and the first substrate 22 and at a position of the thin film transistor 25, for supporting between the intermediate substrate 21 and the first substrate 22, so as to ensure uniformity of thicknesses of a cell formed by aligning and combining the two substrates.

Alternatively, the electronic ink in the ink bag 51 includes a transparent dispersion medium and two kinds of ink with different colors or gray scales and different polarities, for example, white ink 52 and black ink 53 with polarities opposite to each other. When the white ink is a negative white ink and the black ink is a positive black ink, the initial state is white and the display state of the writing trace is black. Certainly, in practical applications, two kinds of ink with other colors or gray scales may be used.

Alternatively, the electronic ink in the ink bag 51 may further include electrophoretic particles and a dye solution, where the gray scales of the electrophoretic particles and the dye solution are different.

In the embodiment, the display module 1 further includes a black matrix 13, the black matrix 13 is disposed on a surface of the second substrate 11 facing the intermediate substrate 21, and a second isolation pillar 14 is further disposed between the intermediate substrate 21 and the second substrate 11 and at a position of the black matrix 13. The black matrix 13 is used for shielding an area other than the area where the electronic ink is arranged, in other words, the electronic ink 5 is correspondingly arranged in an opening area of the black matrix 13. The second isolation pillar 14 serves to support the intermediate substrate 21 and the second substrate 11, thereby ensuring uniformity of thickness of a cell formed by aligning and combining the two substrates.

In some implementations, the second substrate 11, the intermediate substrate 21, and the first substrate 22 are all flexible substrates. Therefore, the texture of the electronic ink screen can be much similar to paper, the electronic ink screen can be thinned easily, and the thickness of the electronic ink screen is even equal to that of paper (for example, 1 mm).

Figure 4:
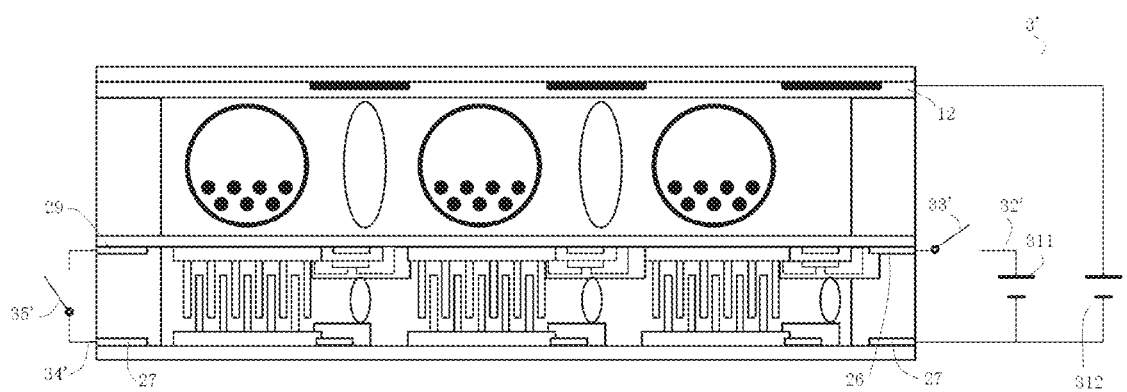
FIG. 4 is a block diagram of an electronic ink screen according to an embodiment of the present disclosure.
Figure 5:
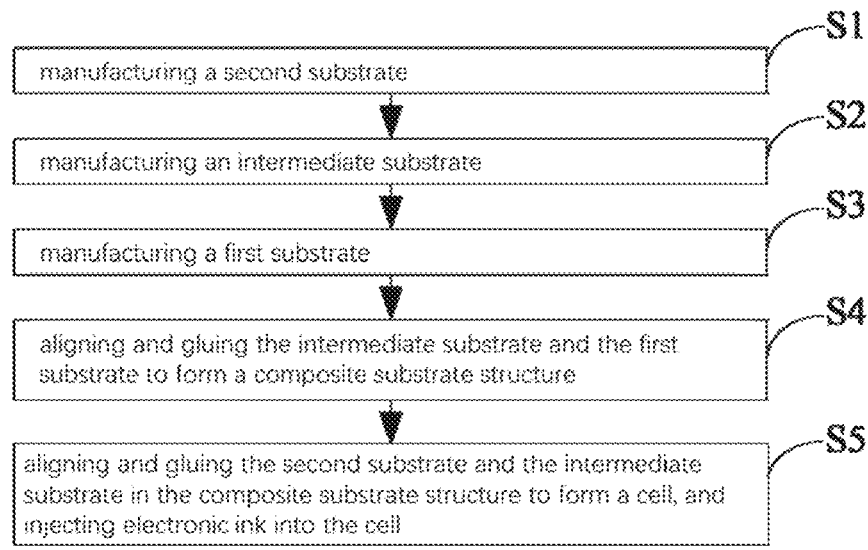
FIG. 5 is a flowchart of a method for manufacturing an electronic ink screen according to an embodiment of the present disclosure.

Referring to FIG. 4, an embodiment of the present disclosure provides an electronic ink screen, which is different from that in the above embodiment only in that: a circuit module 3' with a structure different from that of the circuit module 3 is included.

Specifically, the circuit module 3' includes a recovery power supply 311, a holding power supply 312, a first switch 33', and a second switch 35', where a first terminal of the holding power supply 312 is electrically coupled to the second electrode 12, and a second terminal of the holding power supply 312 is electrically coupled to the first common electrode line 27; a first coupling circuit 32' is disposed between the first terminal of the recovery power supply 311 and the intermediate electrode gate line 26, and the first switch 33' is provided in the first coupling circuit 32'. A second terminal of the recovery power supply 311 is electrically coupled to the first common electrode line 27; a second coupling circuit 34' is provided between the intermediate common electrode line 29 and the first common electrode line 27, and the second switch 35' is provided in the second coupling circuit 34'.

In some implementations, the recovery power supply 311 and the holding power supply 312 are both direct current power supplies, where a value of the voltage output by the recovery power supply 311 ranges from 3V to 5V; a voltage output by the holding power supply 312 is maintained within a range from 0.5V to 1V.

The function of the recovery power supply 311 is the same as that of the power supply 31 in the above embodiment, and the holding power supply 312 is configured to provide power to keep a certain electric field between the first electrode 22 and the second electrode 12, so as to ensure that the electronic ink screen can display a single color or gray scale, such as white, in the full screen in the initial state.

The value of the voltage output by the recovery power supply 311 ranges from 3V to 5V, and in such range, it facilitates to the thin film transistor to be turned on; meanwhile, the value of the voltage output by the holding power supply 312 is kept between 0.5V and 1V, and in such range, a threshold of change of the potential difference across the electronic ink can be ensured to be relatively smaller.

As another technical solution, referring to FIGS. 5 to 9, an embodiment of the present disclosure further provides a method for manufacturing an electronic ink screen, which includes the following steps:

S1, manufacturing a second substrate;
S2, manufacturing an intermediate substrate;
S3, manufacturing a first substrate;
S4, aligning and gluing the intermediate substrate and the first substrate, to form a composite substrate structure;
S5, aligning and gluing the second substrate and the intermediate substrate in the composite substrate structure to form a cell, and injecting electronic ink into the cell.

It is easy to understand that, the processes for manufacturing the second substrate, the intermediate substrate and the first substrate all refer to manufacturing corresponding functional film layers on a base substrate.

Figure 6:
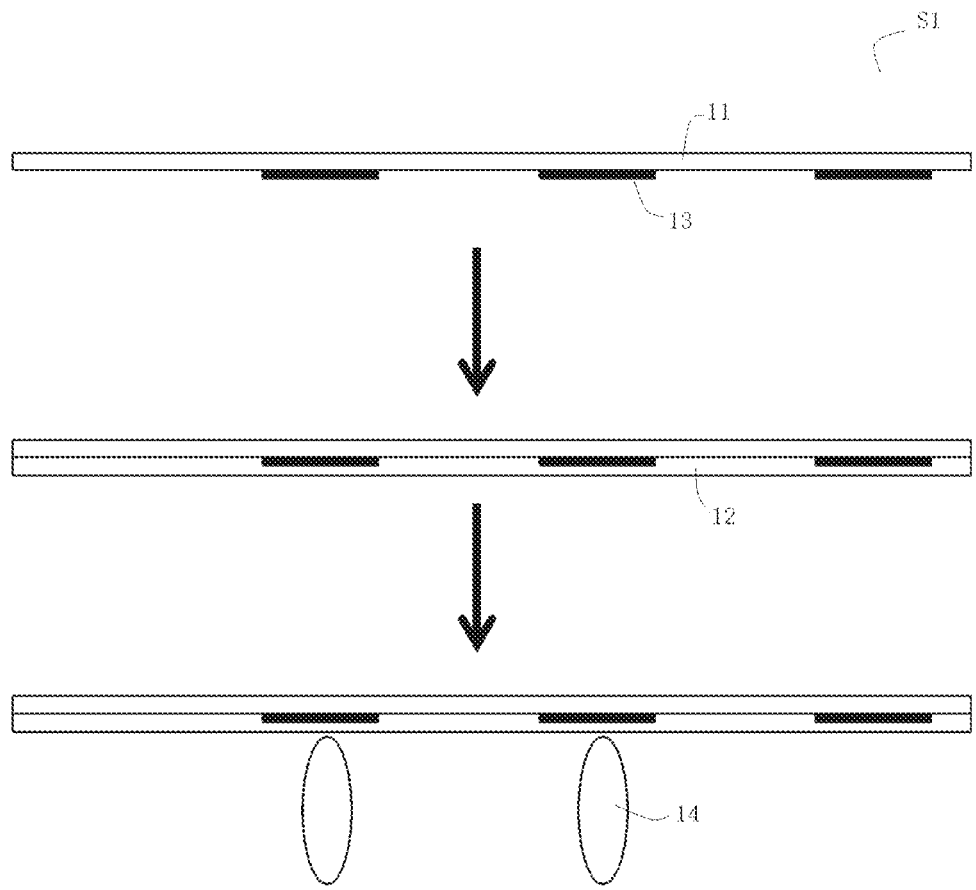
FIG. 6 is a process diagram of step S1 of a method for manufacturing an electronic ink screen according to an embodiment of the present disclosure.

Specifically, as shown in FIG. 6, the manufacturing the second substrate includes: manufacturing a black matrix 13, a second electrode 12, and a second isolation pillar 14 on the second substrate 11.

Figure 7:
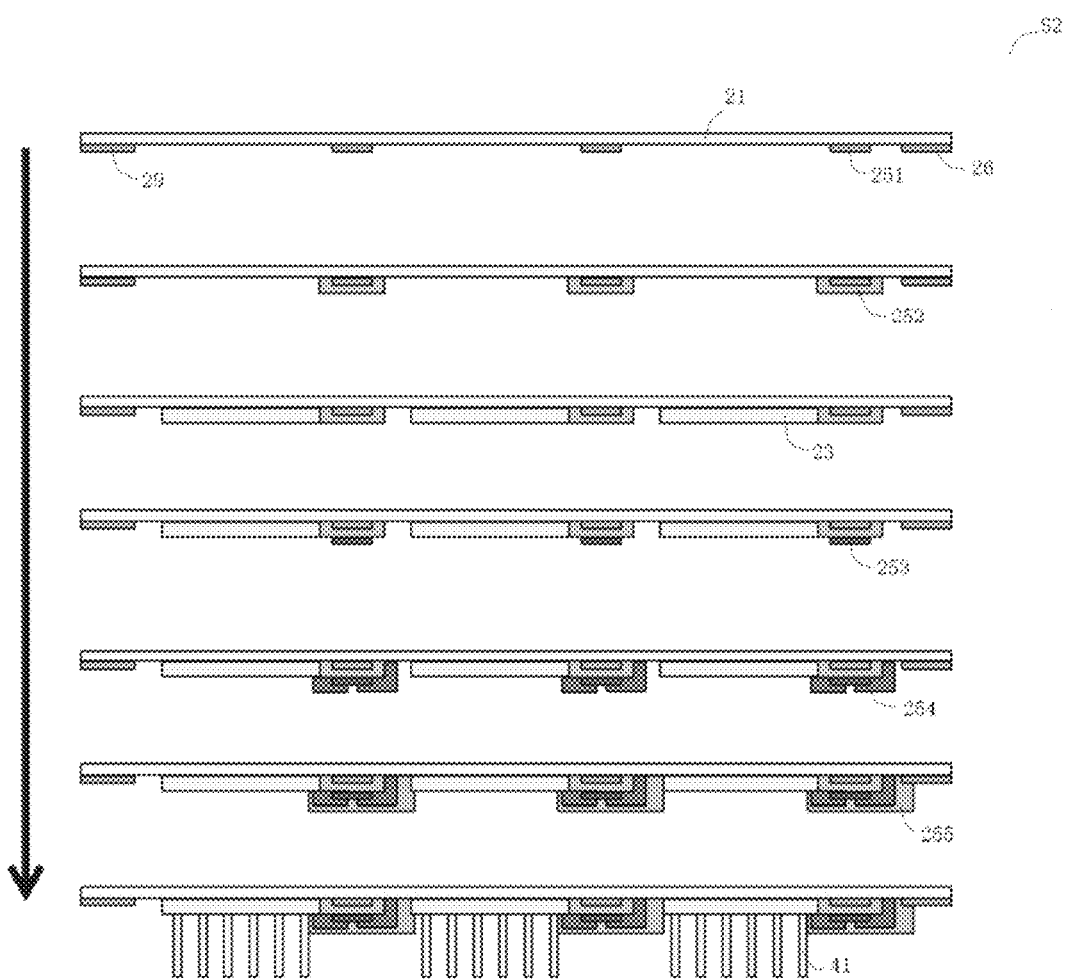
FIG. 7 is a process diagram of step S2 of a method for manufacturing an electronic ink screen according to an embodiment of the present disclosure.

As shown in FIG. 7, the manufacturing the intermediate substrate includes: manufacturing an intermediate electrode gate line 26, an intermediate common electrode line 29, and a gate electrode 251 of a thin film transistor 25, a gate insulating layer 252 of the thin film transistor 25, an intermediate electrode 23, an active layer 253 of the thin film transistor 25, a source-drain layer 254 of the thin film transistor 25, a planarization layer 255 of the thin film transistor 25, and a first nano electrode 41 on the intermediate substrate 21.

Figure 8:
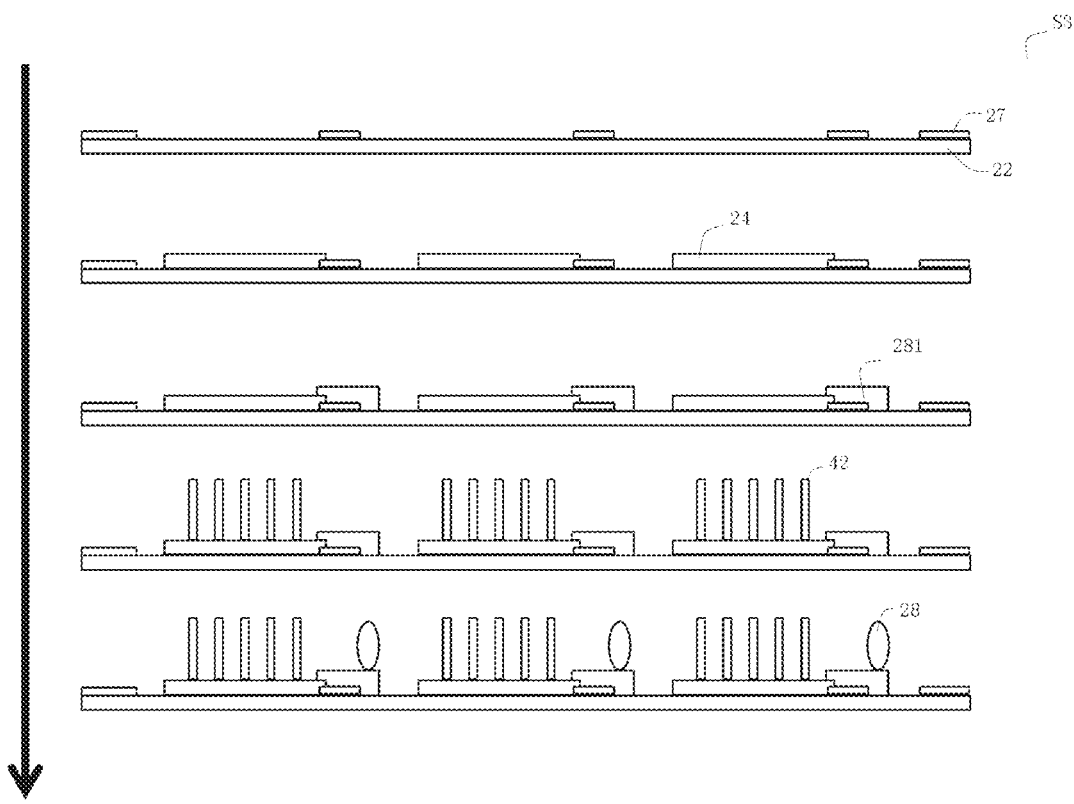
FIG. 8 is a process diagram of step S3 of a method for manufacturing an electronic ink screen according to an embodiment of the present disclosure.

As shown in FIG. 8, the manufacturing the first substrate includes: manufacturing a first common electrode line 27, a first electrode 24, a first electrode planarization layer 281, a second nano electrode 42, and a first isolation pillar 28 on the first substrate 22.

The first nano electrode 41 and the second nano electrode 42 may be manufactured by using an exposure etching process. Specifically, a layer of specified nano-material is deposited or grown on the intermediate electrode 23, and then the first nano electrode 41 is manufactured and formed through the steps of coating photoresist, exposure by using a mask, chemical corrosion, cleaning and the like in sequence; a layer of specified nano-material is deposited or grown on the first electrode 24, and then the second nano electrode 42 is manufactured and formed through the steps of photoresist coating, exposure by using a mask, chemical corrosion, cleaning and the like in sequence.

Figure 9:
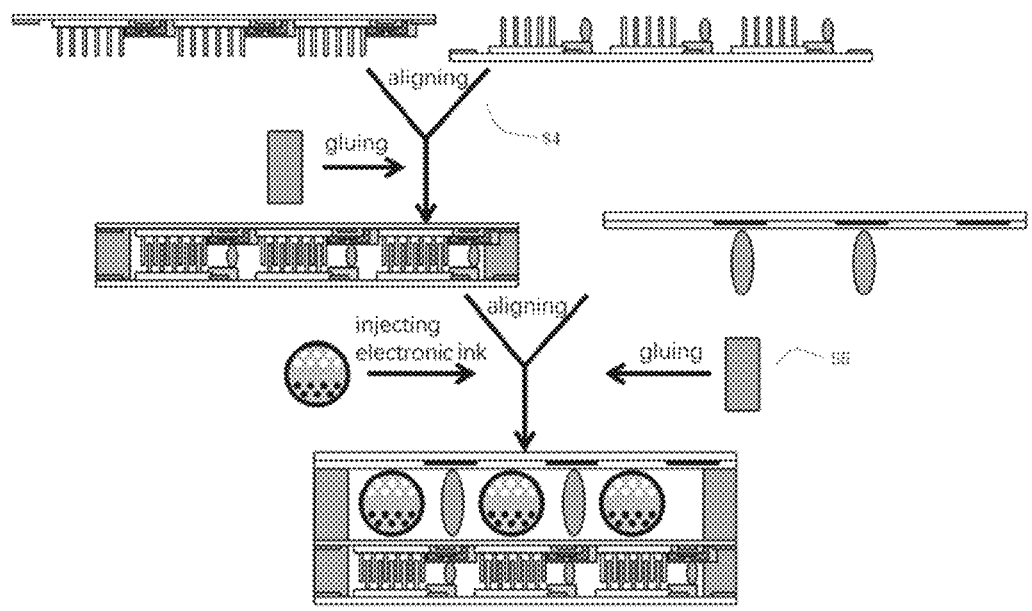
FIG. 9 is a process diagram of steps S4 and S5 of a method for manufacturing an electronic ink screen according to an embodiment of the present disclosure.

As shown in FIG. 9, in step S4, the intermediate substrate and the first substrate that have been completed are aligned and glued to form a composite substrate structure; in step S5, the second substrate and the intermediate substrate in the composite substrate structure are aligned and glued to form a cell, and electronic ink is injected into the ink bag in the process. Thus, the manufacturing of the electronic ink screen is completed.

In the technical solutions of the electronic ink screen and the method for manufacturing the electronic ink screen provided by the above embodiments of the present disclosure, the display module is configured to display by using electronic ink; the control module is configured to convert the touch signal applied from the outside into a change of electric signal of the corresponding one or more pixel units through the electrode microstructure so as to change the display state of the corresponding one or more of the pixel units from the initial state, thereby realizing the writing function; the circuit module is configured to provide electric energy and control the control module to enable the display module to be restored to the initial state, and therefore the writing reset function is achieved. Meanwhile, the touch signal applied from the outside is converted into the change of electric signal of the corresponding one or more of the pixel units by utilizing the principle that the electrode microstructure is based on nano friction power generation, namely, the mutual friction contact between the two nano electrodes made of different materials is utilized, so that the writing track can be displayed in real time, and the display delay can be avoided; in addition, the electronic ink screen provided by the present disclosure consumes energy only when the electronic ink deflects, and the recording of the writing track can be realized by the conversion of the electrode microstructure without additional power consumption, so that the energy consumption can be effectively reduced.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. An electronic ink screen, comprising a display module, a control module and a circuit module, wherein the display module comprises a plurality of pixel units and is configured to display by using electronic ink;
the control module is configured to convert a touch signal applied from outside into a change of electric signal of corresponding one or more of the pixel units through an electrode microstructure, so that a display state of the corresponding one or more of the pixel units is changed from an initial state; the electrode microstructure comprises sub-electrode microstructures in one-to-one correspondence with the pixel units, each of the sub-electrode microstructures comprises a first nano electrode and a second nano electrode which are made of different materials, and the first nano electrode and the second nano electrode are arranged at intervals and configured to be in mutual friction contact in response to that the touch signal applied from the outside is received, so as to generate charge transferring;
the circuit module is configured to supply power and control the control module to restore the display module to the initial state,
wherein the first nano electrode and second nano electrode are comb-shaped electrodes, and teeth of the first nano electrode and teeth of the second nano electrode are alternately arranged in a direction parallel to a display surface and partially overlap in a direction perpendicular to the display surface.

2. The electronic ink screen of claim 1, wherein the control module comprises an intermediate substrate and a first substrate disposed opposite one another;
a plurality of intermediate electrodes, a plurality of thin film transistors, a coupling wire, an intermediate common electrode line and an intermediate electrode gate line are arranged on a surface of the intermediate substrate facing the first substrate, and the intermediate electrodes are arranged in one-to-one correspondence with the pixel units; for each of the pixel units, the first nano electrode is arranged on a surface of the intermediate electrode away from the intermediate substrate, and is electrically coupled to the intermediate electrode; the thin film transistors are arranged in one-to-one correspondence with the pixel units; for each of the pixel units, a gate electrode of the thin film transistor is electrically coupled to the intermediate electrode gate line; a source electrode of the thin film transistor is electrically coupled to the intermediate common electrode line through the coupling wire, and a drain electrode of the thin film transistor is electrically coupled to the intermediate electrode;
a plurality of first electrodes and a first common electrode line are arranged on a surface of the first substrate facing the intermediate substrate, wherein the first electrodes are arranged in one-to-one correspondence with the intermediate electrodes, and are electrically coupled to the first common electrode line; and for each of the pixel units, the second nano electrode is arranged on a surface of the first electrode away from the first substrate, and is electrically coupled to the first electrode.

3. The electronic ink screen of claim 2, wherein the display module further comprises a second substrate disposed opposite to the intermediate substrate and on a side away from the first substrate, and wherein a second electrode is disposed on a surface of the second substrate facing the intermediate substrate and electronic ink is disposed between the second electrode and the intermediate substrate.

4. The electronic ink screen of claim 3, wherein the circuit module includes a power supply, a first switch, and a second switch;
a first terminal of the power supply is electrically coupled to the second electrode, and a second terminal of the power supply is electrically coupled to the first common electrode line;
a first coupling circuit is arranged between the intermediate electrode gate line and a first terminal of the power supply, and the first switch is provided in the first coupling circuit;
a second coupling circuit is arranged between the intermediate common electrode line and the first common electrode line, and the second switch is provided in the second coupling circuit.

5. The electronic ink screen of claim 3, wherein the circuit module includes a recovery power supply, a holding power supply, a first switch, and a second switch;
a first terminal of the holding power supply is electrically coupled to the second electrode, and a second terminal of the holding power supply is electrically coupled to the first common electrode line;

a first coupling circuit is arranged between a first terminal of the recovery power supply and the intermediate electrode gate line, and the first switch is provided in the first coupling circuit; a second terminal of the recovery power supply is electrically coupled to the first common electrode line;

a second coupling circuit is arranged between the intermediate common electrode line and the first common electrode line, and the second switch is provided in the second coupling circuit.

6. The electronic ink screen of claim 3, wherein the intermediate substrate, the first substrate, and the second substrate are all flexible substrates.

7. The electronic ink screen of claim 2, wherein a first isolation pillar is further disposed between the intermediate substrate and the first substrate at a position where the thin film transistor is located.

8. The electronic ink screen of claim 3, wherein the display module further comprises a plurality of ink bags, each of the ink bags is configured to contain the electronic ink and the ink bags are arranged in one-to-one correspondence with the pixel units.

9. The electronic ink screen of claim 3, wherein the display module further comprises a black matrix, the black matrix is disposed on a surface of the second substrate facing the intermediate substrate, and a second isolation pillar is further disposed between the intermediate substrate and the second substrate at a position of the black matrix.

10. The electronic ink screen of claim 3, wherein the electronic ink includes a transparent dispersion medium, a white ink, and a black ink, the white ink having a polarity opposite to that of the black ink; alternatively, the electronic ink includes electrophoretic particles and a dye solution.

11. The electronic ink screen of claim 4, wherein the power supply is a direct current power supply; a value of voltage output by the direct current power supply ranges from 0.5V to 5V.

12. The electronic ink screen of claim 5, wherein the recovery power supply and the holding power supply are both direct current power supplies, wherein a value of voltage output by the recovery power supply ranges from 3V to 5V; a value of voltage output by the holding power supply ranges from 0.5V to 1V.

13. A method for manufacturing an electronic ink screen, comprising:
manufacturing a second substrate;
manufacturing an intermediate substrate;
manufacturing a first substrate;
aligning and gluing the intermediate substrate and the first substrate to form a composite substrate structure;
aligning and gluing the second substrate and the intermediate substrate in the composite substrate structure to form a cell, and injecting electronic ink into the cell;
wherein the manufacturing the second substrate comprises: manufacturing a black matrix, a second electrode and a second isolation pillar on the second substrate;
the manufacturing the intermediate substrate comprises: manufacturing an intermediate electrode gate line, an intermediate electrode, an intermediate common electrode line, a thin film transistor and a first nano electrode on the intermediate substrate;
the manufacturing the first substrate comprises: manufacturing a first common electrode line, a first electrode, a second nano electrode and a first isolation pillar on the first substrate.

14. An electronic ink screen, comprising a display module, a control module and a circuit module, wherein the display module comprises a plurality of pixel units and is configured to display by using electronic ink;
the control module is configured to convert a touch signal applied from outside into a change of electric signal of corresponding one or more of the pixel units through an electrode microstructure, so that a display state of the corresponding one or more of the pixel units is changed from an initial state; the electrode microstructure comprises sub-electrode microstructures in one-to-one correspondence with the pixel units, each of the sub-electrode microstructures comprises a first nano electrode and a second nano electrode which are made of different materials, and the first nano electrode and the second nano electrode are arranged at intervals and configured to be in mutual friction contact in response to that the touch signal applied from the outside is received, so as to generate charge transferring;
the circuit module is configured to supply power and control the control module to restore the display module to the initial state,
wherein the control module comprises an intermediate substrate and a first substrate disposed opposite one another;
a plurality of intermediate electrodes, a plurality of thin film transistors, a coupling wire, an intermediate common electrode line and an intermediate electrode gate line are arranged on a surface of the intermediate substrate facing the first substrate, and the intermediate electrodes are arranged in one-to-one correspondence with the pixel units;
for each of the pixel units, the first nano electrode is arranged on a surface of the intermediate electrode away from the intermediate substrate, and is electrically coupled to the intermediate electrode; the thin film transistors are arranged in one-to-one correspondence with the pixel units; for each of the pixel units, a gate electrode of the thin film transistor is electrically coupled to the intermediate electrode gate line; a source electrode of the thin film transistor is electrically coupled to the intermediate common electrode line through the coupling wire, and a drain electrode of the thin film transistor is electrically coupled to the intermediate electrode;
a plurality of first electrodes and a first common electrode line are arranged on a surface of the first substrate facing the intermediate substrate, wherein the first electrodes are arranged in one-to-one correspondence with the intermediate electrodes, and are electrically coupled to the first common electrode line; and for each of the pixel units, the second nano electrode is arranged on a surface of the first electrode away from the first substrate, and is electrically coupled to the first electrode.

* * * * *